United States Patent [19]

Doi et al.

[11] Patent Number: 4,833,373

[45] Date of Patent: May 23, 1989

[54] SYSTEM FOR SHAKING WATER OFF WINDSHIELD

[75] Inventors: Kazuhiro Doi, Yokohama; Bunichiro Fujii, Yokosuka; Naoki Honda, Yokosuka; Hiroyuki Kanesaka, Yokosuka; Hirofumi Tsuchida, Yokosuka, all of Japan

[73] Assignee: Nissan Motor Company, Limited, Yokohama, Japan

[21] Appl. No.: 36,771

[22] Filed: Apr. 9, 1987

[30] Foreign Application Priority Data

Apr. 9, 1986 [JP] Japan .................................. 61-80000

[51] Int. Cl.4 ............................. B60R 1/06; B60S 1/02
[52] U.S. Cl. ..................................... 318/114; 350/582; 15/250 R
[58] Field of Search ................. 318/116, 118; 310/316; 15/250 R

[56] References Cited

U.S. PATENT DOCUMENTS 4,275,363  6/1981  Mishoro et al. ...................... 318/116
4,554,477  11/1985  Ratcliff ................................ 310/316

FOREIGN PATENT DOCUMENTS 1275897  8/1968  Fed. Rep. of Germany .... 15/250 R
0041225  3/1982  Japan .................................. 350/583
0070754  5/1982  Japan .................................. 15/250 R
60-10686  2/1985  Japan .

Primary Examiner—Patrick R. Salce
Attorney, Agent, or Firm—Pennie & Edmonds

[57] ABSTRACT

A system for shaking water off a surface includes an electromagnetically operable driver unit for driving a member having the surface. The driver unit is connected to a control unit which controls oscillation frequency to be generated by the driver unit. The control unit adjusts the frequency of oscillation transmitted to the member for matching the oscillation frequency with the resonating frequency of the member for effectively shaking the water off the surface.

8 Claims, 6 Drawing Sheets

SYSTEM FOR SHAKING WATER OFF WINDSHIELD

BACKGROUND OF THE INVENTION

1. Field of the Invention

The present invention relates generally to a system for removing water, such as rain drops, from a surface. More specifically, the invention relates to a system for shaking water off an automotive or ship windshield surface, a mirror surface, lens surface and so forth.

2. Field of the Invention

The Japanese Utility Model First Publication (Jikkai) Showa No. 60-106862JJ discloses a system for shaking water off a windshield. In the disclosed system, a electromagnetically operable driver is provided for transmitting vibration or oscillation energy for the windshield. Oscillation of the windshield is transmitted to water, such as rain drops, on the windshield. The oscillating energy thus accumulated in the water and becomes greater than surface tension of the water. This causes the water to be shaken off the windshield.

In order to efficiently transmit the oscillating energy generated by the driver, it is preferable to set the frequency of oscillation in a range substantially corresponding to the resonating frequency range of the windshield.

A difficulty is encountered in setting the oscillation frequency to be generated by the driver. Namely, the resonating frequency of the windshield tends to vary depending upon variation of its mass. The mass varies depending upon the amount of the water on the windshield. That is to say that as the amount water on the windshield decreases so does the total mass of the windshield. This tends to cause the set oscillation frequency of the driver to be different than the resonating frequency of the windshield. When the frequency of the oscillation transmitted from the driver becomes different from the resonating frequency of the windshield, efficiency with which the windshield is oscillate by means of the driver become significantly driven is lowered. This results in significant drop of efficiency in removal of the water from the windshield.

SUMMARY OF THE INVENTION

Therefore, it is an object of the present invention to provide a system for shaking or shedding water off a surface, which can effectively drive the surface to oscillate.

Another object of the invention is to provide a water shaking-off system in which oscillation or vibration frequency is adjustable for matching the oscillation frequency to be transmitted to the surface to the resonating frequency of the surface.

A further object of the invention is to provide a system for effectively removing water, such as rain drops, from an automotive or maritime vessel windshield, a rear-view mirror, lamp lens and so forth.

In order to accomplish the afore-mentioned and other objects, a system for shaking water off a surface, includes an electromagnetically operable driver unit for driving a member bearing the surface. The driver unit is connected to a control unit which controls the oscillation frequency to be generated by the driver unit.

In practice, the control unit is detects variation of the resonating frequency of the member for controlling frequency of the oscillation generated by the driver unit.

According to one aspect of the invention, a system for shaking water off a surface of an essentially planar member comprises a driver unit means coupled with the essentially planar member for driving the latter to oscillate at a controlled frequency for causing water on the surface to be shaken off the surface, a driving signal generator producing a driving signal to be applied to the driver unit means for driving the latter at the controlled frequency, the driving signal being variable in frequency for adjusting the oscillation frequency of the planar member, and means for adjusting the frequency of the driving signal to a resonating frequency of the member.

According to one preferred construction, the driving signal generator means cyclically produces a pulse-train as the drive signal for a given period of time, each of pulses in the pulse-train having different pulse periods for varying frequency of the pulses within a frequency range between a predetermined minimum frequency and a predetermined maximum frequency. The minimum and maximum frequencies defining the frequency range are determined to cover all the possible of resonating frequencys of the planar member. The driving signal generator means varies the frequency of each pulse in the pulse train to gradually increase the frequency from the minimum frequency to the maximum frequency. The planar member may be a windshield of an automotive vehicle or a rear view mirror of an automotive vehicle, installed on the outside of a vehicle body.

In another preferred construction, the system further comprises a detector for detecting oscillating acceleration of the plane member and producing an acceleration indicative detector signal, and the adjusting means receives the acceleration indicative detector signal for detecting a resonating frequency of the planar member, at which the acceleration indicative detector signal value becomes the greatest, and adjusts the oscillation frequency generated by the driver unit means to the detected resonating frequency. The adjusting means gradually varies oscillation frequency at a given rate and continuously monitors the acceleration indicative detector signal values for detecting the peak thereof for detecting the resonating frequency of the planar member.

According to a further preferred construction, the system further comprises a strain gage monitoring the mass of an oscillating planar member which has water on its surface, and the adjusting means derives a resonating frequency of the plane member based on the detected mass. The system further comprises a detector for monitoring the electric current applied to the driver unit means for detecting peak value thereof, and an adjusting means adjusts the driver unit means for driving the planar member at a frequency at which the peak value of the electric current is obtained.

DESCRIPTION OF THE PREFERRED EMBODIMENT

Figure 1:
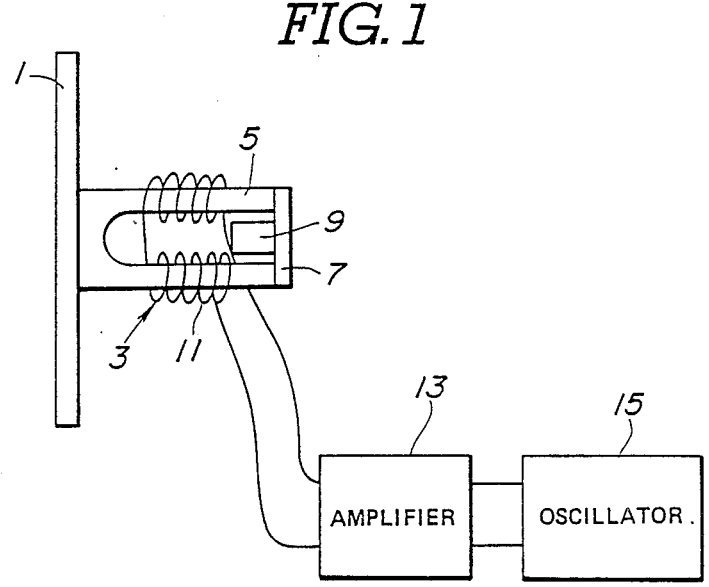
FIG. 1 is a schematic block diagram of the first embodiment of a water shaking-off system according to the invention.

Referring now to the drawings, particularly to FIG. 1, the first embodiment of a system for shaking water off a surface is applied for removing rain drops and so forth from a windshield 1 of an automotive vehicle. An electromagnetic driver unit 3 is mounted on the inner surface of the windshield. The driver unit 3 includes a magnetostrictor-type vibrator member 5. The vibrator member 5 is fitted onto the inner surface of the windshield at one end and extends essentially perpendicular thereto. A yoke plate 7 is attached on the other end of the vibrator member 5. The yoke plate 7 supports a magnetic core 9 which comprises a permanent magnet. A drive coil 11 is wound around the vibrator member 5. The drive coil 11 is connected to an oscillator 15. In the preferred embodiment, the oscillator 15 comprises a sweep oscillator. The oscillator 15 applies a driving pulse of a variable frequency to the drive coil for forming an electromagnetic field around the vibrator member 5, via an amplifier 13. The magnetic core 9 is inserted within the electromagnetic field.

In the preferred embodiment, the sweep oscillator 15 is set to generate one drive pulse every per second. The oscillation frequency of the drive pulses varies as shown in FIG. 2(a). The range through which the oscillation frequency of the sweep oscillator vaires corresponds to the freaquency range of ±0.5 KHz relative to the resonating frequency $f_k$ of the windshield in dry condition. The variation range of the oscillation frequency may be selected in view of the maximum possible amount of water and minimum possible amount of water that may be on the windshield. In the shown embodiment, the resonating frequency $f_k$ of the windshield when dry is 28 KHz.

By applying the different frequency of drive pulses to the drive coil 11, the vibrator member 5 oscillates at a frequency that corresponds to the frequency of the drive pulse. Therefore, within the one second period, oscillation energy of different frequencies varying between ($f_k$−0.5 KHz) to ($f_k$+0.5 KHz), as show in FIG. 2(b) is exerted on the windshield. By varying the frequency of the oscillation generated by the vibrator member 5 within a range of ($f_k$ −0.5 KHz) to ($f_k$+0.5 KHz), the oscillation frequency of the vibrator member 5 will match with the resonating frequency of the windshield 1 at a certain frequency. At this frequency, the windshield 1 is effectively driven to oscillate.

In the water shedding operation, the sweep oscillator 15 generates one second drive pulses which are separated by one second intervals as shown in FIG. 2(a). Each one second, period during which the drive pulses are generated, will be hereafter referred to as "oscillation period" and each one second interval during which the drive pulses are not generated will be hereafter referred to as "oscillation interval".

Figure 2:
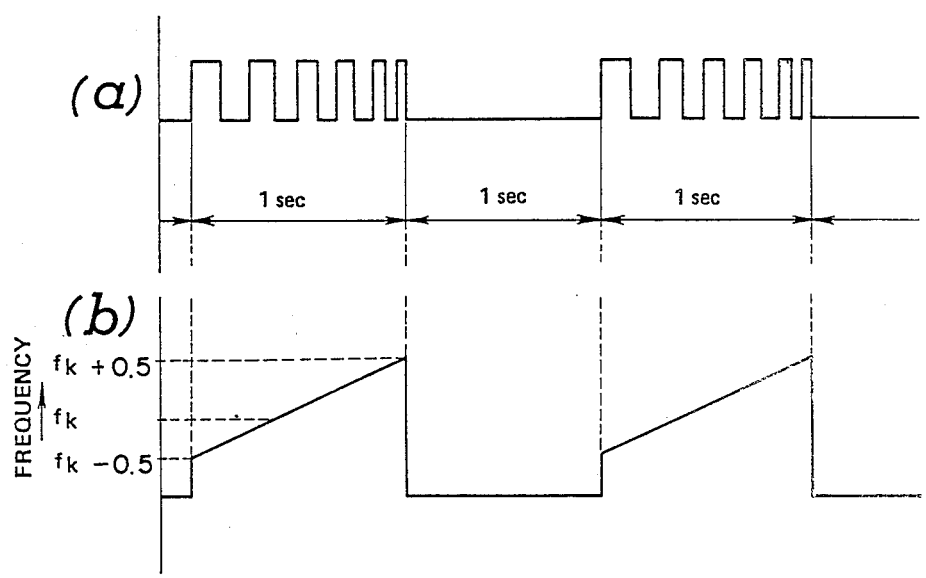
FIG. 2 is a timing chart showing the relationship between input pulse and oscillation frequency.

As seen from FIG. 2, the drive pulses have generated by the sweep oscillator 15 begins at its lowest frequency and sweeps to its highest frequency during the oscillation period. The lowest frequency of the drive pulse corresponds to the frequency $f_k$−0.5 Khz. Within the oscillation period, the pulse width and pulse. At the end of the oscillation period, the frequency of the drive pulse becomes maximum. The maximum frequency corresponds to the frequency $f_k$+0.5 KHz. Therefore, the frequency variation range of the drive pulses in each oscillation period covers essentially all of the resonating frequency range of the windshield 1. Therefore, the vibrator member 5 is driven to vibrate at frequencies corresponding to the drive pulse. The vibration of the vibrator member 5 is transmitted to the windshield 1.

At same point during the oscillation period, the vibration frequency of the vibrator member 5 matches the resonating frequency of the windshield 1. As a result, the windshield 1 resonates with the input vibration from the vibrator member 5. This means that the windshield 1 is provided the vibration energy at the resonation frequency once during every oscillation period.

At the begining of water shedding operation, the water amount on the windshield 1 is relatively large. Therefore, the mass of the windshield 1 with water on it is relatively great. This lowers the resonating frequency of the windshield. The therefor the windshield 1 resonates to the relatively low frequency of vibration tansmitted from the vibrator member 5, at the initial stage of water shedding operation.

Oscillation energy of the windshield, accumulates in the water on the windshield. This accumulated oscillation energy serves as inertia to dislodge the water. When the inertia of the water becomes greater than the surface tension, the water is shaken off the windshield 1. As a result, the amount of water on the windshield 1 is reduced and therefor the overall mass of the windshield is reduced causing the resonating frequency of the windshield to become higher so as to resonate with the higher frequency vibration transmitted through the vibrator member 5. However, since the vibration frequencies transmitted through the vibrator member 5 vary to cover all of the possible resonating frequency range of the windshield, the windshield will resonate at a certain frequency. According to the aforementioned process, most of the water can be removed from the windshield surface.

After shaking most of the water off the windshield surface, the water remaining on the windshield becomes difficult to shake off. However, at this time, a relatively high velocity of water flow occurs in the water on the windshield and the pressure in the water falls low enough for cavitation to occur. By this cavitation, the remaining water can be removed from the windshield surface.

When such a water shaking-off system of the first embodiment is employed for removing the rain drops during driving of the automotive vehicle in the rain, the rain drops on the windshield are shaken off the windshield surface by the repeatedly exerted vibrations.

Therefore, the windshield can be kept clean enough for safe driving.

Figure 3:
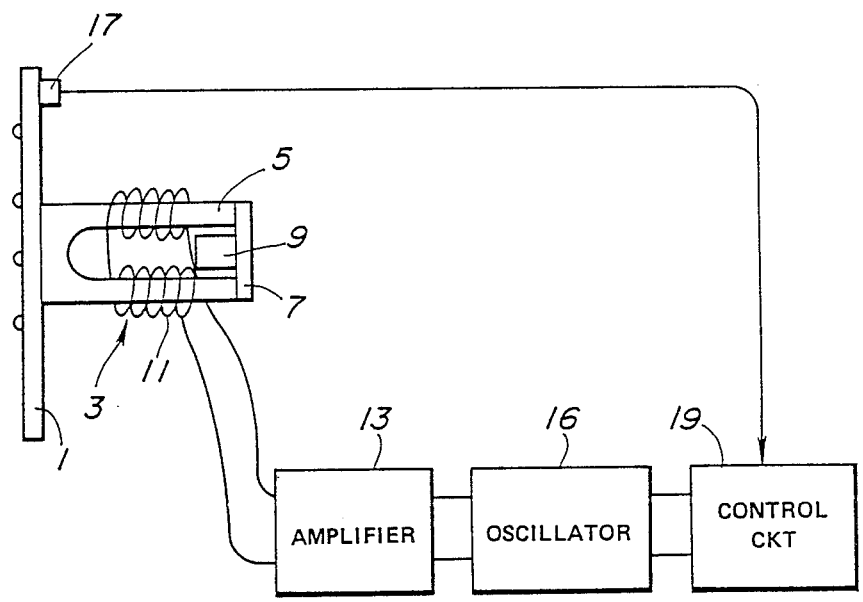
FIG. 3 is a schematic block diagram of the second embodiment of the water shaking-off system according to the invention.

FIG. 3 shows the second embodiment of the water shedding system according to the invention. In this embodiment, an accelerometer 17 is provided for monitoring the acceleration of the windshield 1 as it is driven to vibrate. The accelerometer 17 is designed to produce an acceleration indicative signal which has a value representative of the vibration acceleration of the windshield. As will be appreciated, the acceleration of vibration in the windshield 1 becomes the maximum when the windshield is driven to vibrate by means of the vibrator 5 of the driver unit 3 at the resonating frequency thereof. Therefore, by detecting the peak in the acceleration indicative signal of the accelerometer 17, the resonating frequency of the windshield 1 can be derived.

For this purpose, the second embodiment of the water shaking-off system according to the invention, employs a control circuit 19 connected to the aforementioned accelerometer 17. The control circuit 19 is, in turn, connected to an oscillator 16 has the oscillation frequency is variable of which according to the control voltage applied from the control circuit. The control circuit 19 receives the acceleration indicative signal from the accelerometer 17 to derive the resonating frequency of the windshield 1 and produces the control voltage to adjust the oscillation frequency of the oscillator 16 at the derived resonating frequency of the windshield.

At the controlled frequency, the oscillator generates drive pulses to be transmitted to the drive coil 11 via the amplifier 13 in order to drive the vibrator member 5.

Figure 4:
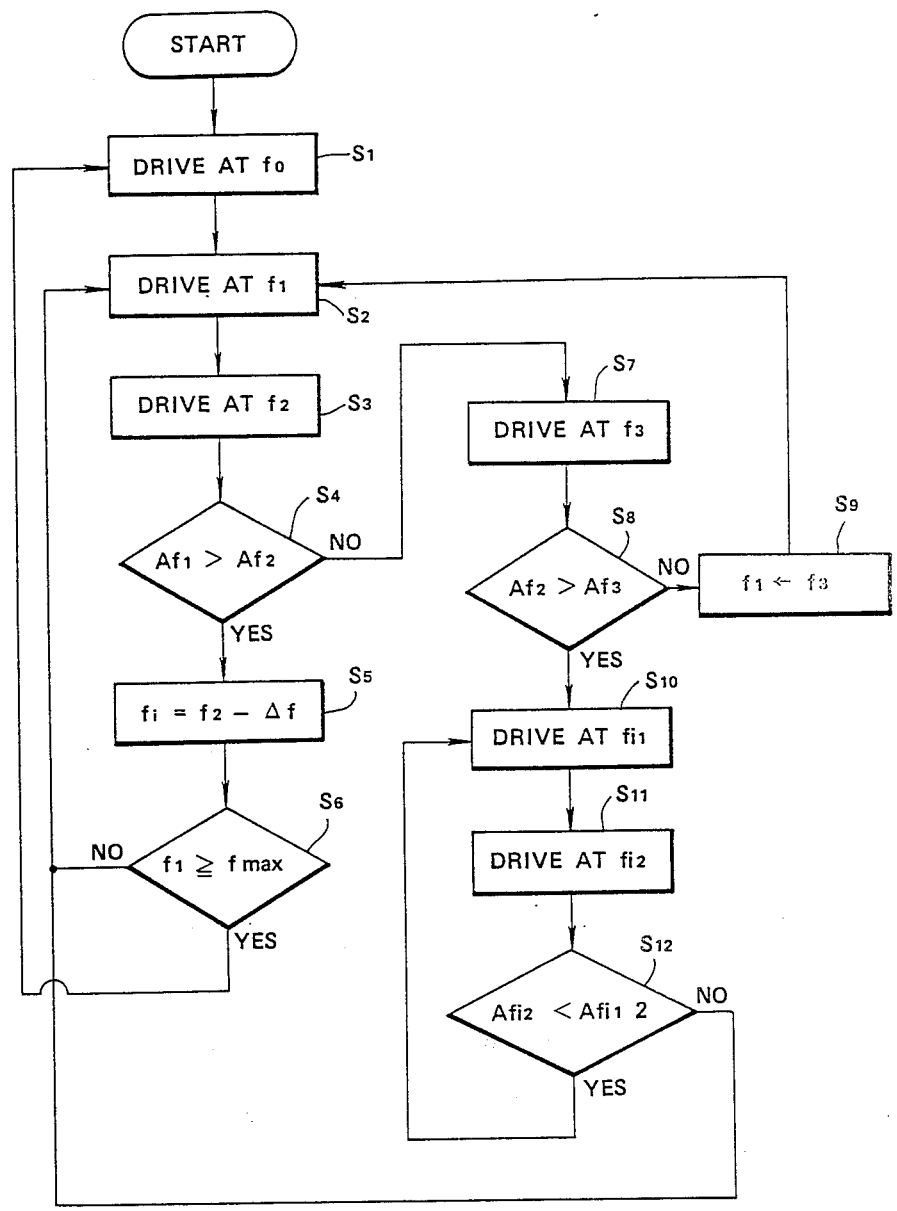
FIG. 4 is a flowchart showing operation of the second embodiment of the water shaking-off system of FIG. 3.

FIG. 4 shows a flowchart showing operation of the control circuit for deriving the resonating frequency of the windshield and for producing a control voltage based on the derived resonating frequency. In the oscillation control operation, the control circuit 19, at first, outputs the control voltage for driving the oscillator 16 at a frequency $f_0$, at a step $S_1$. The initial oscillation frequency $f_0$ corresponds to the lowest possible frequency of the associated windshield 1 when the maximum possible amount of water is on the windshield surface. By applying the initial control voltage from the control circuit 19, the osciilator 16 generates the drive pulses having frequency of $f_0$. Therefore, the vibrator member 5 is driven at $f_0$ frequency to drive the windshield 1. By this, part of the water on the windshield is removed.

After this, the control circuit 19 derives the control voltage by adding a predetermined value which corresponds to a predetermined frequency increase $\Delta f$, at a step $S_2$. By this control signal, the oscillator is driven to generate the drive pulses of a frequency $f_1$ (=$f_0+\Delta f$). While the windshield is driven to vibrate at a frequency of $f_1$, the control circuit 19 reads the acceleration indicative signal value $Af_1$ and temporarily stores the read value in a temporary register (not shown).

Then, at a step $S_3$, the control circuit 19 derives the control voltage by adding a predetermined value which corresponding to a predetermined frequency increase $\Delta f$. By this control signal, the oscillator is driven to generate the drive pulses of a frequency $f_2$ (=$f_2+\Delta f$). While the windshield is driven to vibrate at the frequency $f_2$, the control circuit 19 reads the acceleration indicative signal value $Af_2$ and temporarily stores the read value in a temporary register. After the step $S_3$, the acceleration indicative signal values $Af_1$ and $Af_2$ are read and compared, at a step $S_4$.

If the $Af_1$ value is greater than the $Af_2$ value, the control voltage is decreased at the predetermined value corresponding to the frequency $\Delta f$. Therefore, the oscillator 16 is driven to generate drive pulses of the frequency $f_i$ (=$f_2-\Delta f\Delta=f_1$), at a step $S_5$. After deriving the oscillation frequency at the step $S_5$, the derived oscillation frequency $f_i$ is compared with a predetermined maximum frequency $f_{max}$, at a step $S_6$. If the $f_i$ frequency is higher than or equal to the maximum frequency, then process returns to the step $S_1$. On the other hand, when the $f_i$ frequency is lower than the maximum frequency $f_{max}$ as checked at the step $S_6$, the process returns to the step $S_2$.

Namely, the steps $S_2$, $S_3$, $S_4$, $S_5$ and $S_6$ constitute a loop for increasing the oscillation frequency of the oscillator 16 by the predetermined $\Delta f$ frequency. This loop is repeated until the oscillation frequency of the oscillator 16 reaches the maximum frequency or the $Af_1$ value becomes smaller than or equal to the $Af_2$ value.

On the other hand, when the $Af_1$ value is smaller than or equal to the $Af_2$ value, goes to step $S_7$. In the step $S_7$, the control voltage is increased by a given value corresponding to the predetermined frequency $\Delta f$. Therefore, the oscillator 16 is driven to produce drive pulses of the increased frequency $f_3$ (=$f_2+\Delta f$). During the windshield oscillation at the $f_3$ frequency, the acceleration $Af_3$ is detected by the accelerometer 17. The control circuit 19 receives the acceleration indicative signal from the accelerometer 17 to temporarily store the $Af_3$ value in the temporary register.

After the step $S_7$, the $Af_3$ value is compared with the $Af_2$ value as previously stored at a step $S_8$. When the $Af_3$ value is greater than or equal to the $Af_2$ value as checked at the step $S_8$, the $f_3$ frequency indicative control voltage is set as new $f_1$ frequency indicative control voltage at a step $S_9$ and thereafter, the process returns to the step $S_2$. As long as the $Af_1$ value is held smaller than or equal to the $Af_2$ value as checked at the step $S_4$ and the $Af_3$ value is held greater than or equal to the $Af_2$ value as checked at the step $S_8$, the steps $S_2$, $S_3$, $S_4$, $S_7$, $S_8$ and $S_9$ form a loop to be repeatedly performed until the $Af_1$ value becomes greater than the $Af_2$ value or the $Af_2$ value becomes the $Af_3$ value.

On the other hand, when the $Af_3$ value is smaller than the $Af_2$ value, the control voltage is decreased by the predetermined value corresponding to the predetermined frequency $\Delta f$ to drive the oscillator 16 at the decreased frequency $f_{i1}$ (=$f_3-\Delta f=f_2$) at a step $S_{10}$. While the windshield 1 is driven at the frequency $f_{i1}$, the magnitude of acceleration $Af_{i1}$ is monitored by the accelerometer 17. The control circuit 19 receives the acceleration indicative signal to temporarily register the $Af_{i1}$ value. Thereafter, the control voltage is further reduced by the predetermined voltage corresponding to the $\Delta f$ of the frequency to drive the oscillator 16 at the decreased frequency $f_{i2}$ (=$f_{i1}-\Delta f=f_1$), at a step $S_{11}$. Then, the acceleration $Af_{i2}$ is registered. At a step $S_{12}$, the $Af_{i1}$ and $Af_{i2}$ values are compared. As long as the $Af_{i2}$ value is held greater than the $Af_{i1}$ value as checked at the step $S_{12}$, the steps $S_{10}$, $S_{11}$ and $S_{12}$ are repeated so as to gradually decrease the oscillating frequency at the rate of $\Delta f$. On the other hand, when the $Af_{i2}$ value becomes smaller than or equal to the $Af_{i1}$ value, the process goes to the step $S_2$.

By preforming the aforementioned processes, the control circuit 19 effectively adjusts the oscillation frequency of the oscillator 16 to a frequency essentially corresponding to the resonating frequency of the windshield 1. Therefore, optimum water shaking-off characteristics can be obtained.

Figure 5:
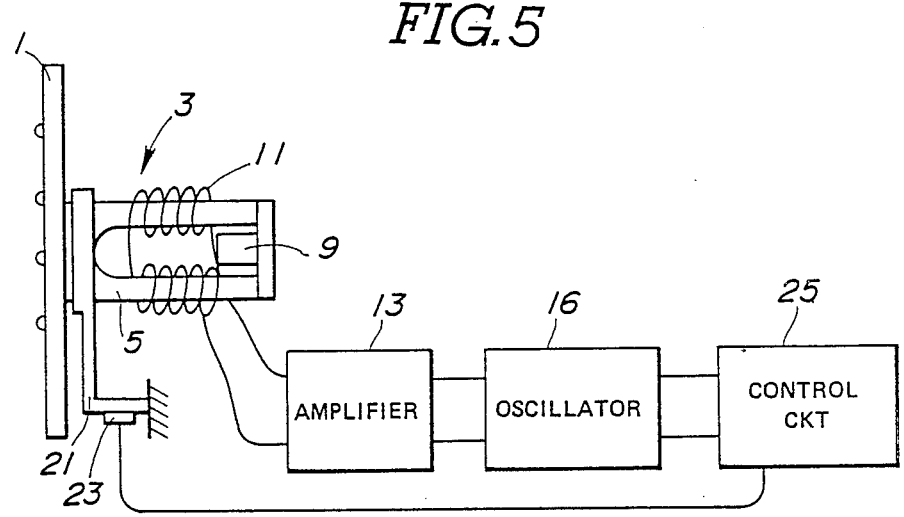
FIG. 5 is a schematic block diagram of the third embodiment of the water shaking-off system according to the invention.

FIG. 5 shows the third embodiment of the water shedding system according to the invention. In this embodiment, the vibrator member 5 is supported by means of a stationary bracket 21 which is rigidly secured onto a stationary member of the vehicle body. A strain gage 23 is attached to the stationary bracket 21 for monitoring strain on the bracket. Though it has not been clearly shown on FIG. 5, an elastic member is interposed between the vibrator member 5 and the stationary bracket 21. The strain gage 23 monitors strain of the stationary bracket while the vibrator member 5 vibrates to drive the windshield in order to produce a strain indicative signal. The strain indicative signal is fed to a control circuit 25 which derives the mass of the windshield 1 based on the strain indicative signal value. The control circuit 25 further derives the resonating frequency of the windshield.

In general, the relationship between the resonating frequency f of the windshield and the mass m (mass of the windshield) $+\alpha$ (mass of the water on the windshield surface) can be illustrated by the following equation:

$$f = k/(m+\alpha)$$

where k is a coefficient of an elasticity of the windshield with the water.

As will be appreciated herefrom, since the resonating frequency f can be derived on the basis of the mass of the windshield. The control circuit 25 can derive the resonating frequency according to the foregoing equation in terms of the mass derived on the basis of the strain indicative signal.

The control circuit 25 further derives the control voltage necessary to be applied to the oscillator 16 to drive the latter at the frequency corresponding to the derived resonating frequency. Therefore, the vibrator member 5 vibrates at the frequency essentially corresponding to the resonating frequency of the windshield. This optimizes the windshield driving characteristics of the driver unit 3.

It should be appreciated, since the relationship between the resonating frequency and the mass can be illustrated by the foregoing equation, a look-up table can be established taking the mass weight $(m+\alpha)$ as look-up table parameter. Once the look-up table is established, the resonating frequency can be derived in terms of the mass by performing table look-up.

Figure 6:
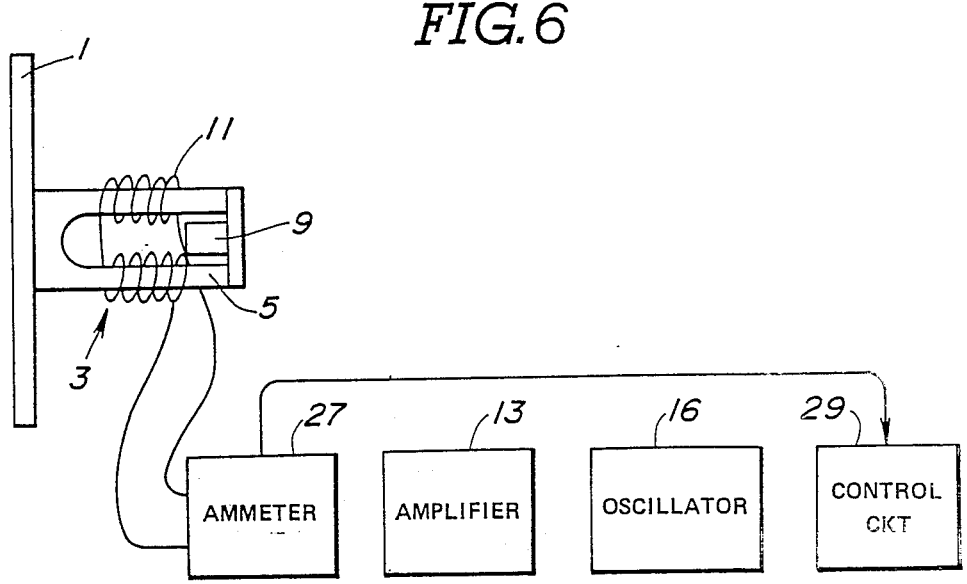
FIG. 6 is a schematic block diagram of the fourth embodiment of the water shaking-off system of the invention.

FIG. 6 is a fourth embodiment of the water shedding system according to the invention. In this embodiment, an ammeter 27 is disposed between the amplifier 13 and the drive coil 11. The ammeter 27 thus measures the electric current flowing through the drive coil 11. As will be appreciated, since the electric current to flow through the drive coil 11 becomes maximum when the windshield 1 resonates with the vibration of the vibrator member 5. Therefore, by detecting the vibration frequency at which the current value flowing through the drive coil 11 becomes maximum, the resonating frequency can be determined.

The ammeter 27 outputs a current value indicative signal to be fed to a control circuit 29. The control circuit 29 performs oscillation control for the oscillator 16 according to the process illustrated in FIG. 6

Figure 7:
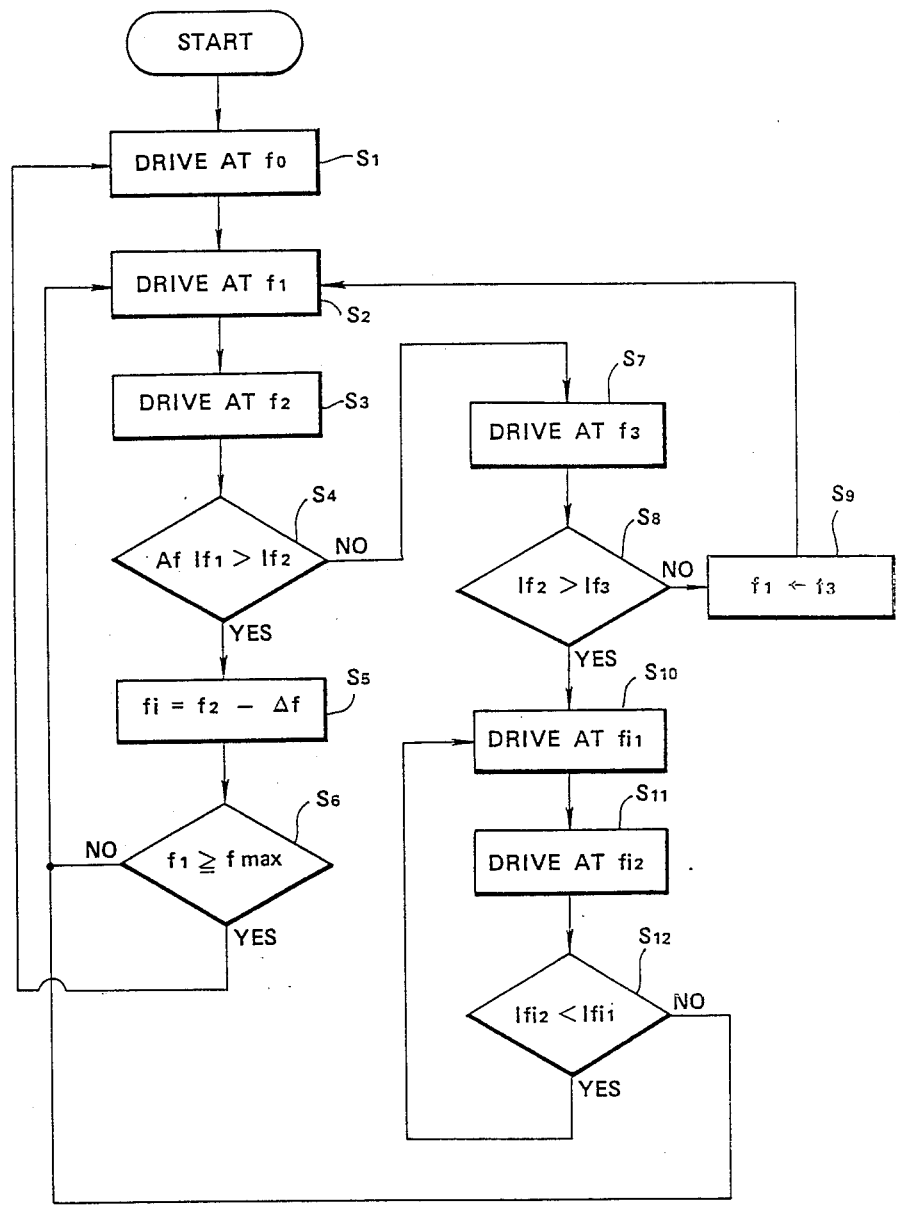
FIG. 7 is a flowchart showing operation of the fourth embodiment of the water shaking-off system of FIG. 6.

As will be seen from FIG. 7, the process for detecting the resonating frequency of the windshield 1 is quite similar to that discussed with respect to FIG. 4. Namely, FIG. 4 shows a flowchart showing operation of the control circuit for deriving the resonating frequency of the windshield and for producing the control voltage based on the derived resonating frequency. In the oscillation control operation, the control circuit 19, at first, outputs the control voltage for driving the oscillator 16 at a frequency $f_0$, at a step $S_{21}$. The initial oscillation frequency $f_0$ corresponds to the possible lowest frequency of the associated windshield 1 when the maximum possible amount of water is on the windshield surface. By applying the initial control voltage from the control circuit 19, the osciilator 16 generates the drive pulses having frequency of $f_0$. Therefore, the vibrator member 5 is driven at $f_0$ frequency to drive the windshield 1. By this, part of the water on the windshield is removed.

After this, the control circuit 19 derives the control voltage by adding a preetermined value which corresponding to a predetermined increasing frequency $\Delta f$, at a step $S_{22}$. By this control signal, the oscillator is driven to generate the drive pulses of a frequency $f_1$ ($=f_0+\Delta f$). While the windshield is driven to vibrate at the frequency $f_1$, the control circuit 19 reads the current value indicative signal value $If_1$ and temporarily stores the read value in a temporary register (not shown).

Then, at a step $S_{23}$, the control circuit 19 derives the control voltage by adding a preetermined value which corresponds to a predetermined increasing frequency $\Delta f$. By this control signal, the oscillator is driven to generate drive pulses of a frequency $f_2$ ($=f_2+\Delta f$). While the windshield is driven to vibrate at frequency $f_2$, the control circuit 19 reads the current value indicative signal value $If_2$ and temporarily stores the read value in a temporary register. After the step $S_{23}$, the current value indicative signal values $If_1$ and $If_2$ are read and compared, at a step $S_{24}$.

If the $If_1$ value is greater than the $If_2$ value, the control voltage is decreased at the predetermined value corresponding to the frequency $\Delta f$. Therefore, the oscillator 16 is driven to generate the drive pulses of the frequency $f_i$ ($=f_2-\Delta f\Delta=f_1$), at a step $S_{25}$. After deirving the oscillation frequency at the step $S_{25}$, the derived oscillation frequency $f_i$ is compared with a predetermined maximum frequency $f_{max}$, at a step $S_{26}$. If the $f_i$ frequency is higher than or equal to the maximum frequency, then process returns to the step $S_{21}$. On the other hand, when the $f_i$ frequency is lower than the maximum frequency $f_{max}$ as checked at the step $S_{26}$, the process returns to the step $S_{22}$.

Namely, the steps $S_{22}$, $S_{23}$, $S_{24}$, $S_{25}$ and $S_{26}$ constitute a loop for increasing the oscillation frequency of the oscillator 16 by the predetermined $\Delta f$ frequency. This loop is repeated until the oscillation frequency of the oscillator 16 reaches the maximum frequency or the $If_1$ value becomes smaller than or equal to the $If_2$ value.

On the other hand, when the $If_1$ value is smaller than or equal to the $If_2$ value, the routine goes to a step $S_{27}$. In the step $S_{27}$, the control voltage is increased by a given value corresponding to the predetermined frequency $\Delta f$. Therefore, the oscillator 16 is driven to produce the drive pulses of the increased frequency $f_3$ ($=f_2+\Delta f$). During the windshield oscillation at the $f_3$ frequency, the current value $If_3$ is detected by the ammeter 27. The control circuit 19 receives the acceleration indicative signal from the accelerometer 17 to temporarily store the $If_3$ value in the temporary register.

After the step $S_{27}$, the $If_3$ value is compared with the $If_2$ value as previously stored at a step $S_{28}$. When the $If_3$ value is greater than or equal to the $If_2$ value as checked at the step $S_{28}$, the $f_3$ frequency indicative control voltage is set as new $f_1$ frequency indicative control voltage at a step $S_{29}$ and thereafter, the process returns to the step $S_{22}$. As long as the $If_1$ value is held smaller than or equal to the $If_2$ value as checked at the step $S_{24}$ and the $If_3$ value is held greater than or equal to the $If_2$ value as checked at the step $S_{28}$, the steps $S_{22}$, $S_{23}$, $S_{24}$, $S_{27}$, $S_{28}$ and $S_{29}$ form a loop to be repeatedly performed until the $If_1$ value becomes greater than the $If_2$ value or the $If_2$ value becomes the $If_3$ value.

On the other hand, when the $If_3$ value is smaller than the $If_2$ value, the control voltage is decreased by the predetermined value corresponding to the predetermined frequency $\Delta f$ to drive the oscillator 16 at the decreased frequency $f_{i1}$ $(=f_3-\Delta f=f_2)$ at a step $S_{30}$. While the windshield 1 is driven at the frequency $f_{i1}$, the magnitude of the current value $If_{i1}$ is monitored by the ammeter 27. The control circuit 19 receives the current value indicative signal to temporarily register the $If_{i1}$ value. Thereafter, the control voltage is further reduced by the predetermined voltage corresponding to the $\Delta f$ of the frequency to drive the oscillator 16 at the decreased frequency $f_{i2}$ $(=f_{i1}-\Delta f=f_1)$, at a step $S_{31}$. Then, the current value $If_{i2}$ is registered. At a step $S_{32}$, the $If_{i1}$ and $If_{i2}$ values are compared. As long as the $If_{i2}$ value is held greater than the $If_{i1}$ value as checked at the step $S_{32}$, the steps $S_{30}$, $S_{31}$ and $S_{32}$ are repeated to gradually decrease the oscillating frequency at the rate of $\Delta f$. On the other hand, when the $If_{i2}$ value becomes smaller than or equal to the $If_{i1}$ value, the process goes to the step $S_{22}$.

By preforming the foregoing processes, the control circuit 19 effectively adjust the oscillation frequency of the oscillator 16 to a frequency substantially corresponding to the resonating frequency of the windshield 1. Therefore, optimum water shedding characteristics can be obtained.

Figure 8:
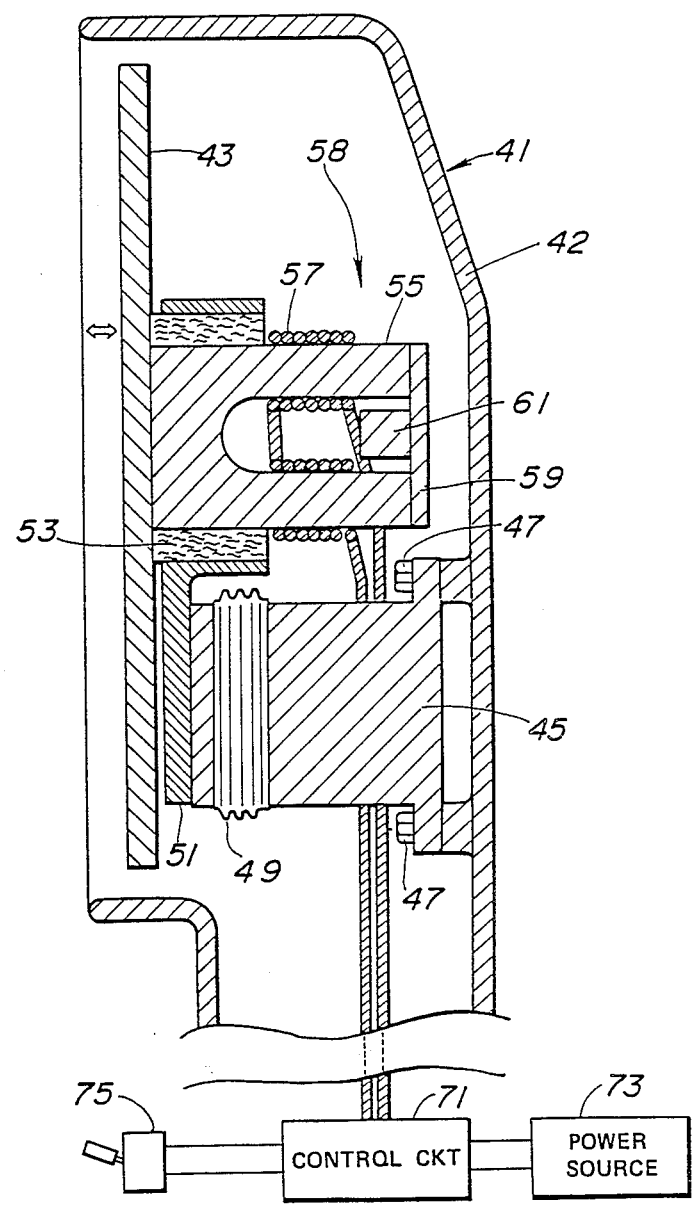
FIG. 8 is a sectional view of the fifth embodiment of the water shaking-off system of the invention, which is applied for a door mirror of an automotive vehicle for shaking water, such as rain drops, off a mirror surface.

FIG. 8 shows the fifth embodiment of the water shedding system according to the present invention. In this embodiment, the shedding system is applied for a door mirror 41 for shaking water off a reflector surface. As is well known, the door mirror 41 comprises a mirror housing 42 and a reflecting mirror 43 with exposing the reflector surface through an opening end of the mirror housing. A driver unit 58 is supported within the mirror housing 42 by means of a support assembly including a stay 51. The stay 51 is, in turn, mounted upon the support 45 which has base secton rigidly secured onto a projection projecting from the inner periphery of the mirror housing by means of a fastener bolts 47. The support 45 also has an expandable bellows section 49 which allows the stay 51 to move toward and away from the reflecting mirror 43.

A vibrator member 55 of the driver unit 58 is supported by the stay 51 with an annular elastic member 53 disposed therebetween. The vibrator member 55 is formed with an axially extending cut-out to define a pair of leg portions. Drive coils 57 are wound around the leg portions of the vibrator member 55. A yoke 59 with a magnetic core 61 is attached to the vibrator member 55 in such a manner that the magnetic core is disposed within the magnetic field formed when the drive coils 57 are energized. The drive coils 71 are connected to a control circuit 71 which is, in turn, connected to a power source 73 and a manual switch 75.

The control circuit 71 is of the same construction as set forth with respect to the first to fourth embodiment. Therefore, the control circuit 71 asjusts the oscillation frequency to be transmitted to the reflector mirror to the resonating frequency of the latter. Therefore, the water, such as rain water on the reflector surface, can be effectively removed for providing clear rear view observation.

As set forth above, the water shedding system according to the present invention can fulfills all of the objects and advantages sought therefor.

What is claimed is:

1. A system for shaking water off a surface of an essentially planar member wherein the mass of the water and of the planar member varies depending upon the amount of water on the planar member comprising:
   a driver unit means coupled with said essentially planar member for driving the latter to oscillate at a controlled frequency for causing oscillation at said controlled frequency of said water on said surface to shake off said surface;
   detector means for detecting the oscillating acceleration of said planar member and producing a signal indicative of the detected acceleration;
   a driving signal generator producing a driving signal to be applied to said driver unit means for driving the latter at said controlled frequency, said driving signal being variable of the frequency for adjusting the oscillation frequency of said planar member; and
   means responsive to said acceleration indicating signal for adjusting the frequency of said driving signal generator to a resonating frequency of said water covered planar member.

2. A system for shaking water off a surface as set forth in claim 1, wherein said adjusting means gradually varies oscillation frequency at a given rate and continuously monitors said acceleration indicative detector signal values for detecting the peak thereof for detecting said resonating frequency of said planar member.

3. A system for shaking water off a surface as set forth in claim 2, wherein said planar member is an automotive windshield.

4. A system for shaking water off a surface as set forth in claim 2, wherein said planar member is a rear view mirror of an automotive vehicle.

5. A system for shaking water off a surface of an essentially planar member comprising:
   a driver unit means coupled with said essentially planar member for driving the latter to oscillate at a controlled frequency for causing oscillation at said controlled frequency of said water of said surface to shake off said surface;
   a strain gage monitoring mass of the oscillating planar member which has water on said surface;
   a driving signal generator producing a driving signal to be applied to said driver unit means for driving the latter at said controlled frequency, said driving signal being variable of the frequency for adjusting the oscillation frequency of said planar member; and
   means for adjusting the frequency of said driving signal to a resonating frequency of said member, said adjusting member deriving a resonating frequency of said planer member based on said mass weight.

6. A system for shaking water off the surface as set forth in claim 5, which further comprises a detector for monitoring electric current applied to said driver unit means for detecting the greatest value thereof, and said adjusting means adjust said driver unit means for driving said plane member to the frequency at which said greatest value of said electric current is obtained.

7. A system for shaking water off a surface of a vehicular windshield comprising:
   a driver unit means coupled with said windshield for driving the latter to oscillate at a controlled frequency for causing oscillation at said controlled frequency of said water of said surface to shake off said surface;
   a driving signal generator producing a driving signal to be applied to said driver unit means for driving the latter at said controlled frequency, said driving signal being variable of the frequency for adjusting the oscillation frequency of said windshield;
   a sensor means for detecting a preselected parameter which affecting resonating frequency of said windshield to produce a sensor signal indicative thereof; and
   means for deriving a resonating frequency of said planer member on the basis of said sensor signal value and adjusting the frequency of said driving signal for driving said driver unit means at a frequency corresponding to said resonating frequency of said member.

8. A system for shaking water off a surface of an essentially planar member comprising:
   a driver unit means coupled with said essentially planar member for driving the later to oscillate at a controlled frequency for causing oscillation at said controlled frequency of said water of said surface to shake off surface;
   a driving signal generator producing a driving signal to be applied to said driver unit means for driving the latter at said controlled frequency, said driving signal being variable of the frequency for adjusting the oscillation frequency of said planar member;
   a sensor means for monitoring variation of mass weight of said planar member for producing a mass weight indicative signal; and
   means for deriving a resonating frequency of said planar member on the basis of said sensor signal value and adjusting the frequency of said driving signal for driving said driver unit means at a frequency corresponding to said resonating frequency of said member.

* * * * *